US008473495B2

(12) United States Patent
Grieselhuber et al.

(10) Patent No.: US 8,473,495 B2
(45) Date of Patent: *Jun. 25, 2013

(54) CENTRALIZED WEB-BASED SOFTWARE SOLUTION FOR SEARCH ENGINE OPTIMIZATION

(75) Inventors: Ray Grieselhuber, San Diego, CA (US); Brian Bartell, San Diego, CA (US); Dema Zlotin, La Jolla, CA (US); Russ Mann, Temecula, CA (US)

(73) Assignee: Covario, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/970,781

(22) Filed: Dec. 16, 2010

(65) Prior Publication Data

US 2011/0320461 A1 Dec. 29, 2011

Related U.S. Application Data

(63) Continuation of application No. 11/689,406, filed on Mar. 21, 2007, now Pat. No. 7,877,392.

(60) Provisional application No. 60/868,702, filed on Dec. 5, 2006, provisional application No. 60/868,705, filed on Dec. 5, 2006, provisional application No. 60/823,615, filed on Aug. 25, 2006.

(51) Int. Cl.
*G06F 17/30* (2006.01)

(52) U.S. Cl.
USPC ............................ 707/737; 707/748; 707/749

(58) Field of Classification Search
USPC ......................................... 707/737, 748, 755
See application file for complete search history.

(56) References Cited

U.S. PATENT DOCUMENTS

| 6,401,075 | B1 | 6/2002 | Mason et al. |
| 6,654,725 | B1 | 11/2003 | Langheinrich et al. |
| 6,810,356 | B1 | 10/2004 | Garcia-Franco |
| 6,925,442 | B1 | 8/2005 | Shapira et al. |

(Continued)

FOREIGN PATENT DOCUMENTS

| WO | 2004003701 A2 | 1/2004 |
| WO | 2004079551 A1 | 9/2004 |
| WO | 2005052755 A2 | 6/2005 |

OTHER PUBLICATIONS

Jutla et al., "Developing Internet E-Commerce Benchmarks" In Systems Archive. vol. 24, Issue 6 (Sep. 1999) Special issue on information systems support for electronic commerce, p. 475-493. Year of Publ. 1999 [retrieved on Jul. 17, 2007]. Retrieved from the internet, URL: http://www.e-gov.gr/local/ism-egov/resources-egov/information%20Systems%20-%Developing%20Internet%20eCommerce%20Benchmarks.pdf>.

(Continued)

*Primary Examiner* — Hanh Thai
(74) *Attorney, Agent, or Firm* — Cooley LLP

(57) ABSTRACT

A system and method for modifying a parameter of a website in order to optimize an organic listing of the website at one or more search engines is described. Several embodiments include methods and systems for generating scored representations based upon different portions of data associated with a website, and then combining the scored representations to achieve a result. The result indicates a feature of the website that may be modified in order to optimize the organic ranking of the website at one or more search engines.

16 Claims, 7 Drawing Sheets

U.S. PATENT DOCUMENTS

| | | | |
|---|---|---|---|
| 7,043,450 B2 | 5/2006 | Velez et al. | |
| 7,185,085 B2 | 2/2007 | Bean | |
| 7,206,838 B2 | 4/2007 | Boyd et al. | |
| 7,225,246 B2 | 5/2007 | Shapira | |
| 7,343,412 B1* | 3/2008 | Zimowski | 709/226 |
| 2002/0032608 A1 | 3/2002 | Kanter | |
| 2002/0073199 A1 | 6/2002 | Levine et al. | |
| 2002/0082901 A1 | 6/2002 | Dunning et al. | |
| 2002/0083188 A1 | 6/2002 | Hericy et al. | |
| 2002/0112048 A1 | 8/2002 | Gruyer et al. | |
| 2002/0154163 A1 | 10/2002 | Melchner | |
| 2002/0161648 A1 | 10/2002 | Mason et al. | |
| 2003/0014519 A1 | 1/2003 | Bowers et al. | |
| 2003/0046389 A1 | 3/2003 | Thieme | |
| 2003/0061232 A1* | 3/2003 | Patterson | 707/104.1 |
| 2003/0074252 A1 | 4/2003 | Chandler-Pepelnjak et al. | |
| 2003/0105677 A1 | 6/2003 | Skinner | |
| 2003/0172349 A1 | 9/2003 | Katayama et al. | |
| 2003/0208578 A1 | 11/2003 | Taraborelli et al. | |
| 2004/0059625 A1 | 3/2004 | Schrader | |
| 2004/0107137 A1 | 6/2004 | Skinner | |
| 2004/0148307 A1* | 7/2004 | Rempell | 707/102 |
| 2004/0215509 A1 | 10/2004 | Perry | |
| 2004/0215515 A1 | 10/2004 | Perry | |
| 2004/0225562 A1 | 11/2004 | Turner | |
| 2005/0010475 A1 | 1/2005 | Perkowski et al. | |
| 2005/0065928 A1 | 3/2005 | Mortensen et al. | |
| 2005/0137939 A1 | 6/2005 | Calabria et al. | |
| 2005/0144064 A1 | 6/2005 | Calabria et al. | |
| 2005/0149396 A1 | 7/2005 | Horowitz et al. | |
| 2005/0209920 A1 | 9/2005 | Stubbs et al. | |
| 2005/0234953 A1 | 10/2005 | Zhang et al. | |
| 2005/0256954 A1 | 11/2005 | Shapira et al. | |
| 2005/0262050 A1 | 11/2005 | Fagin et al. | |
| 2005/0288954 A1 | 12/2005 | McCarthy et al. | |
| 2006/0026128 A1* | 2/2006 | Bier | 707/3 |
| 2006/0041480 A1 | 2/2006 | Briggs | |
| 2006/0069663 A1 | 3/2006 | Adar et al. | |
| 2006/0080239 A1 | 4/2006 | Hartog | |
| 2006/0080321 A1 | 4/2006 | Horn et al. | |
| 2006/0085408 A1 | 4/2006 | Morsa | |
| 2006/0117002 A1 | 6/2006 | Swen | |
| 2006/0129453 A1 | 6/2006 | Gardner et al. | |
| 2006/0167749 A1 | 7/2006 | Pitkow et al. | |
| 2006/0173822 A1 | 8/2006 | Watson et al. | |
| 2006/0253345 A1 | 11/2006 | Heber | |
| 2007/0027754 A1 | 2/2007 | Collins et al. | |
| 2007/0038608 A1* | 2/2007 | Chen | 707/3 |
| 2007/0067217 A1 | 3/2007 | Schachter et al. | |
| 2007/0067331 A1 | 3/2007 | Schachter et al. | |
| 2007/0112959 A1 | 5/2007 | Bean | |
| 2007/0156621 A1 | 7/2007 | Wright et al. | |
| 2007/0203789 A1* | 8/2007 | Jain et al. | 705/14 |
| 2007/0255754 A1* | 11/2007 | Gheel | 707/104.1 |
| 2007/0288454 A1* | 12/2007 | Bolivar et al. | 707/5 |
| 2007/0288514 A1* | 12/2007 | Reitter et al. | 707/104.1 |
| 2008/0010142 A1 | 1/2008 | O'Brien et al. | |
| 2008/0104113 A1* | 5/2008 | Wong et al. | 707/104.1 |
| 2008/0109318 A1 | 5/2008 | Szmanda | |
| 2008/0133500 A1 | 6/2008 | Edwards et al. | |

OTHER PUBLICATIONS

PCT/US07/062736 International Search Report and Written Opinion mailed Oct. 2, 2007.
PCT/US07/086552 International Search Report and Written Opinion mailed Oct. 31, 2008.
PCT/US07/086553 International Search Report and Written Opinion mailed Nov. 3, 2008.
U.S. Appl. No. 11/689,406 Final Rejection mailed Apr. 27, 2010.
U.S. Appl. No. 11/689,406 Non-Final Rejection mailed Oct. 26, 2009.
U.S. Appl. No. 11/689,406 Non-Final Rejection mailed Apr. 15, 2009.
U.S. Appl. No. 11/689,414 Final Rejection mailed Jul. 30, 2009.
U.S. Appl. No. 11/689,414 Final Rejection mailed May 20, 2009.
U.S. Appl. No. 11/689,414 Non-Final Rejection mailed Jan. 8, 2009.
Newman, et al. "Rate of Return Analysis," Engineering Economic Analysis, 9th ed, New York, Oxford UP, 2004, p. 238.
PCT/US07/076798 International Search Report and Written Opinion mailed Oct. 30, 2008.
U.S. Appl. No. 11/758,592 Non-Final Rejection mailed Sep. 1, 2011.
U.S. Appl. No. 12/329,391 Non-Final Rejection mailed Dec. 22, 2010.
U.S. Appl. No. 12/329,391 Final Rejection mailed May 24, 2011.
Wilson, Bill "The Machine Learning Dictionary," Cse.unsw.ed.au. University of Southern Wales, Aug. 30, 2000. Web. Dec. 6, 2010 <http://www.cse.unsw.edu.au/~billw/mldict.html>.
U.S. Appl. No. 11/678,002 Non-Final Rejection mailed Feb. 1, 2012.
U.S. Appl. No. 12/329,391 Non-Final Rejection mailed Dec. 21, 2011.

* cited by examiner

CENTRALIZED WEB-BASED SOFTWARE SOLUTION FOR SEARCH ENGINE OPTIMIZATION

CROSS-REFERENCE TO RELATED APPLICATIONS

This application is a continuation of and claims priority to U.S. Utility patent application Ser. No. 11/689,406, entitled "Centralized Web-Based Software Solution for Search Engine Optimization," filed on Mar. 21, 2007, now U.S. Pat. No. 7,877,392 which claims priority to U.S. Provisional Patent Application Ser. No. 60/868,702, entitled "Centralized Web-Based Software Solution for Search Engine Optimization," filed on Dec. 5, 2006, U.S. Provisional Patent Application Ser. No. 60/868,705, entitled "System and Method for Measuring the Effectiveness of an Online Advertisement Campaign," filed on Dec. 5, 2006, and to U.S. Provisional Patent Application Ser. No. 60/823,615, entitled, "System and Method for Aggregating Online Advertising Data and Providing Advertiser Services," filed on Aug. 25, 2006. This application is also related to U.S. Provisional Patent Application Ser. No. 60/778,594, entitled "System and Method for Managing Network Based Advertising Conducted by Channel Partners of an Enterprise, filed on Mar. 1, 2006. The content of each of these applications is hereby incorporated by reference herein in its entirety for all purposes.

FIELD OF THE INVENTION

The invention relates to, among other things, methods and systems for optimization of websites ("sites") with respect to organic search results generated by search engines in response to user queries. In particular, but not by way of limitation, aspects of the invention pertain to one or more centralized web-based software solutions that evaluate sites and identify features of those sites that may be optimized.

BACKGROUND OF THE INVENTION

With the growth of search engines, business entities (e.g., companies) are dedicating greater portions of their marketing budgets to search engine optimization (SEO) initiatives. Typically, SEO initiatives are driven by "organic" search results. In this regard, the organic listing of a website ("site") pertains to the relative ranking of that site in the algorithmic results generated by a particular search engine on the basis of particular keywords. This contrasts with sponsored or paid search results which are often listed proximate such organic search results and which list sites that have compensated the operator of the search engine for such listing. For various strategic reasons, a business entity may drive content of a site it owns or operates so that the site appears in organic search results created by one or more search engines. With respect to measuring the effectiveness of an organic SEO initiative, previously-known technology does not enable an enterprise-scale business entity (e.g., an enterprise-scale business entity) to measure the effectiveness of organic search results associated with various search engines. Furthermore, previously-known technology does not effectively allow a business entity to audit its site(s) in an automated fashion using SEO principles across many sites and across many search engines in a way that reflects enterprise-scale hierarchies of the business entity.

SUMMARY OF THE INVENTION

Exemplary embodiments of the invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one aspect, the invention provides a system and method for modifying one or more features of a website in order to optimize the website in accordance with an organic listing of the website at one or more search engines. The inventive systems and methods include using scored representations to represent different portions of data associated with a website. Such data may include, for example, data related to the construction of the website and/or data related to the traffic of one or more visitors to the website. The scored representations may be combined with each other (e.g., by way of mathematical operations, such as addition, subtraction, multiplication, division, weighting and averaging) to achieve a result that indicates a feature of the website that may be modified to optimize a ranking of the website with respect to the organic listing of the website at one or more search engines.

In one embodiment, for example, the scored representations may be combined by generating a respective weight for each of the scored representations, and then applying the respective weights to their respective scored representations. Upon applying the respective weights, the weighted scored representations may be summed to achieve an intermediate result, which is then divided by a sum of the respective weights to achieve the result that may be used to optimize a ranking of the website with respect to the organic listing of the website at one or more search engines.

BRIEF DESCRIPTION OF THE DRAWINGS

Various objects and advantages and a more complete understanding of the invention are apparent and more readily appreciated by reference to the following Detailed Description and to the appended claims when taken in conjunction with the accompanying Drawings wherein:

FIG. 5 illustrates a second user interface that may be presented to a user when representing client-pertinent metrics developed during linear and/or non-linear combinations in accordance with certain aspects of the invention;

DETAILED DESCRIPTION OF EMBODIMENTS OF THE INVENTION

The invention relates to, among other things, methods and systems for optimization of websites ("sites") to enhance organic search results generated by search engines in response to user queries. Several embodiments of the invention pertain to one or more centralized web-based software solutions that evaluate the effectiveness of search engine optimization (SEO) with respect to sites of a business entity. More specifically, embodiments of the software solutions may evaluate adherence to SEO best practices, track organic rankings of a site with respect to one or more search engines, determine one or more particular improvements for enhancing the organic rankings of the site, implement the one or more particular improvements, and/or develop one or more reports for display on a user interface.

Figure 1:
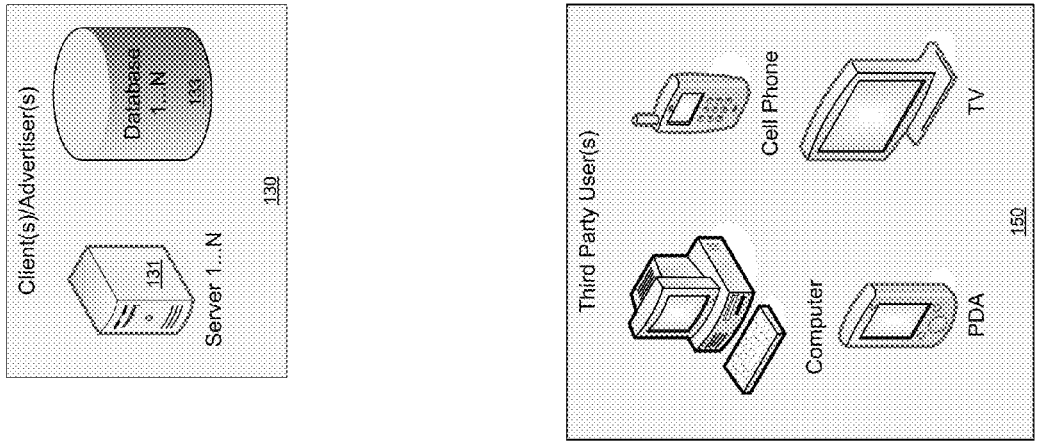
FIG. 1 shows a block diagram depicting a typical network system for analyzing search engine optimization effectiveness of a website.
Figure 1:
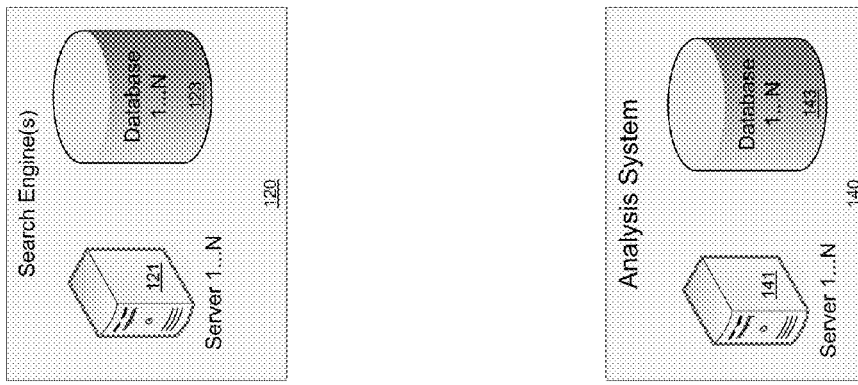

Aspects of the invention are designed to operate on computer systems, servers, and/or other like devices. While the details of embodiments of the invention may vary and still be within the scope of the claimed invention, FIG. 1 shows a block diagram depicting a typical network system 100 for analyzing SEO effectiveness of a site in accordance with the invention. The network system 100 is only one example of a suitable computing environment and is not intended to suggest any limitation as to the scope of use or functionality of the invention. Neither should the network system 100 be interpreted as having any dependency or requirement relating to any one or combination of components illustrated in the exemplary network system 100.

Aspects of the invention may be described in the general context of computer-executable instructions, such as program modules, being executed by a computer or server. Generally, program modules include routines, programs, objects, components, data structures, and the like that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

As is shown, the network system 100 includes a communications network 110, such as the Internet or a private network, capable of providing communication between devices at search engine(s) 120, advertiser/client(s) 130, an SEO analysis system 140, and third party user(s) 150 described hereinafter. The devices of FIG. 1 communicate with each other via any number of methods known in the art, including wired and wireless communication pathways.

As shown in FIG. 1, a search engine 120 is accessible by a third party user 150, a client 130, and by the analysis system 140. The third party user 150 may utilize any number of computing devices that are configured to retrieve information from the World Wide Web ("WWW"), such as a computer, a personal digital assistant (PDA), a cell phone, a television (TV), and other network communications-enabled devices. The client 130 is typically a business entity with one or more websites that are to be indexed by a search engine 120 or a social network. The analysis system 140 operates one or more servers 141 capable of Internet-based communication with the search engine 120 and the client 130. As is discussed below, the modeling system 140 enables the client 130 to model the effectiveness of an SEO initiative with respect to other SEO initiatives of the client 130 or entities other than the clients 130. It is a feature of embodiments of the invention that these models enable the client 130 to quickly identify marketing inefficiencies and/or opportunities.

As those skilled in the art will appreciate, various intermediary network routing and other elements between the communication network 110 and the devices depicted in FIG. 1 have been omitted for the sake of simplicity. Such intermediary elements may include, for example, the public-switched telephone network (PSTN), gateways or other server devices, and other network infrastructure provided by Internet service providers (ISPs).

Figure 2:
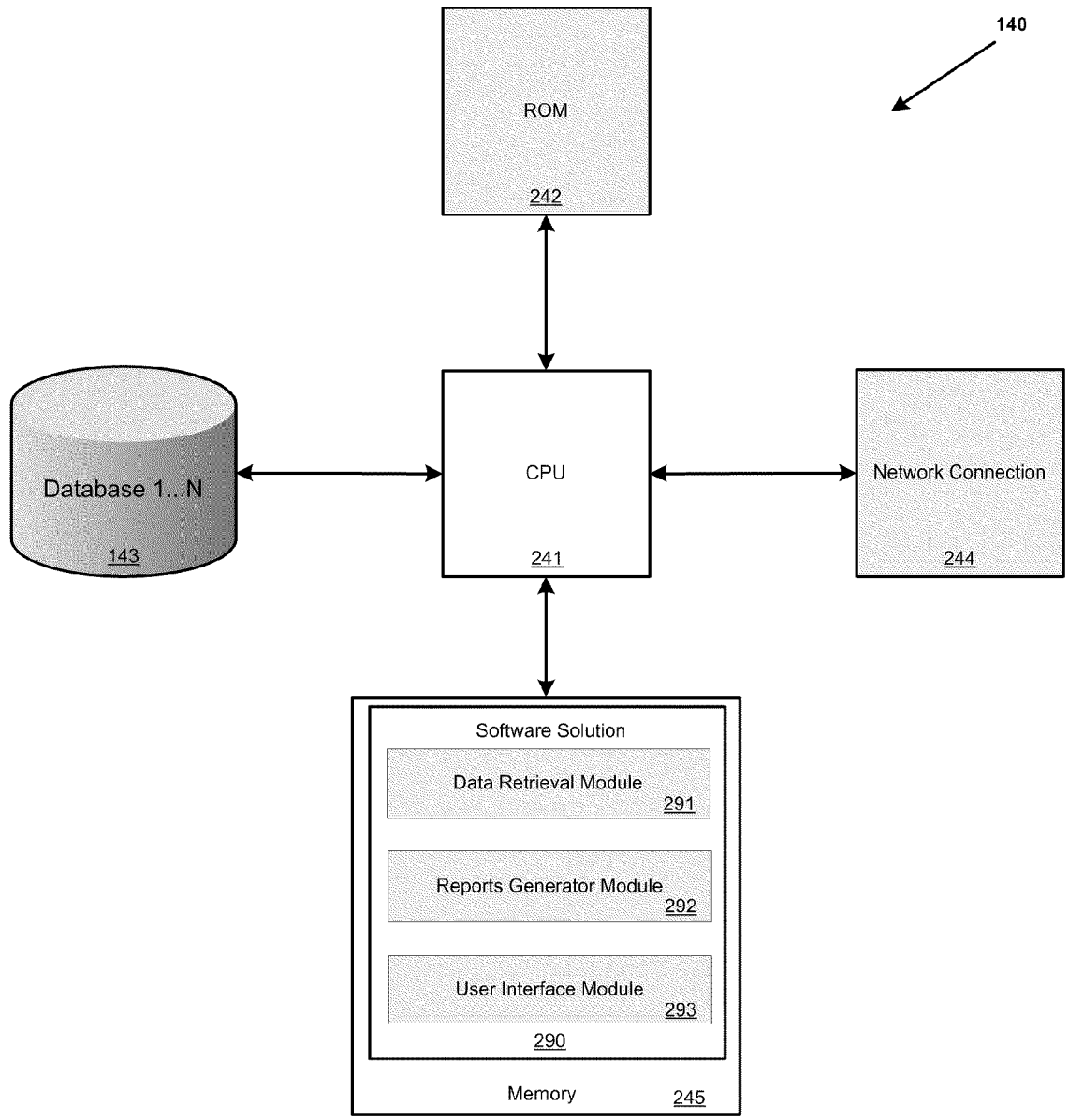
FIG. 2 illustrates one implementation of a search engine optimization analysis system.

Attention is now drawn to FIG. 2, which depicts one implementation of the analysis system 140. As is shown, the analysis system 140 may include, but not by way of limitation, a processor 241 coupled to ROM 242, the database 143, a network connection 244, and memory 245 (e.g., random access memory (RAM)).

The database 143 is described herein in several implementations as hard disk drive for convenience, but this is certainly not required, and one of ordinary skill in the art will recognize that other storage media may be utilized without departing from the scope of the invention. In addition, one of ordinary skill in the art will recognize that the database 143, which is depicted for convenience as a single storage device, may be realized by multiple (e.g., distributed) storage devices.

As shown, a software solution 290 includes a statistic generator module 291, a report generator module 292, and a user interface ("UI") module 293, all of which are implemented in software and are executed from the memory 244 by the processor 241. The solution 290 can be configured to operate on personal computers (e.g., handheld, notebook or desktop), servers or any device capable of processing instructions embodied in executable code. Moreover, one of ordinary skill in the art will recognize that alternative embodiments, which implement one or more components of the invention in hardware, are well within the scope of the invention. Each module 291-293 is associated with one or more functions of the invention describe herein.

Basic Operation of the Software Solution

In general terms, the solution 290 analyzes the construction of a website ("site") for any possible aspect of that site's construction that would affect the site's organic ranking with respect to one or more search engines. The solution 290 may make recommendations regarding improvements with respect to the site's construction. For example, the solution 290 may make recommendations based on the size of one or more webpages ("pages") belonging to a site. Alternative recommendations may pertain to whether keywords are embedded in a page's title, meta content and/or headers. The solution 290 may also make recommendations based on traffic referrals from search engines or traffic-related data from directories and media outlets with respect to the organic ranking of a site. Media outlets may include data feeds, results from an API call and imports of files received as reports offline (i.e., not over the Internet) that pertain to Internet traffic patterns and the like. One of skill in the art will appreciate alternative recommendations.

Figure 3:
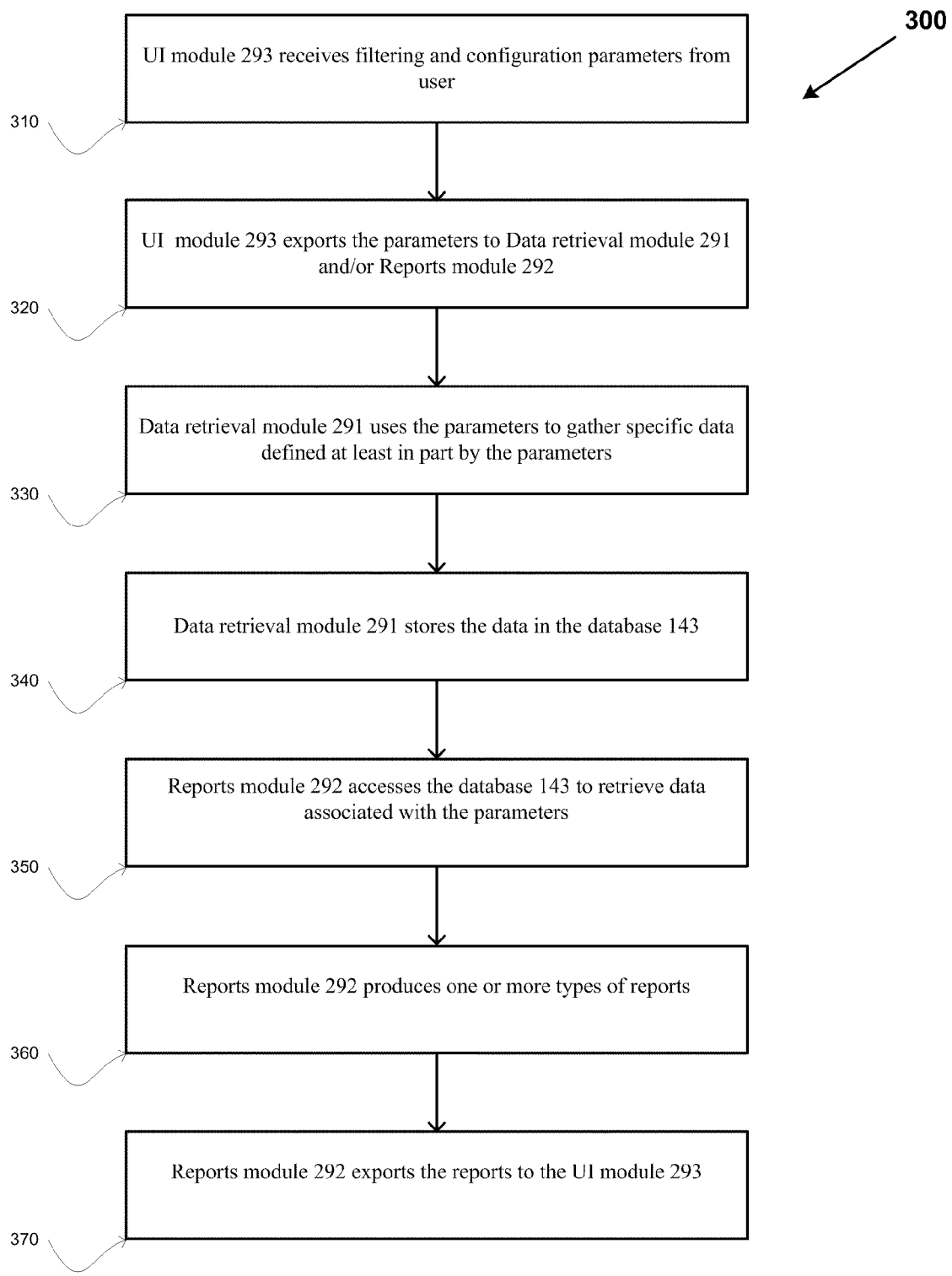
FIG. 3 depicts a process flow diagram illustrating steps taken by a software solution in accordance with one embodiment of the invention.

The modules 291-293 operate in concert with each other to perform certain functions of the solution 290. By way of example, FIG. 3 depicts a process flow diagram 300 illustrating steps taken by the solution 290 in accordance with one embodiment of the invention. As shown in step 310, the UI module 293 may receive filtering and configuration parameters from a user (e.g., a system administrator, the client 130, etc.). The UI module 293, in step 320, may export those parameters to the data retrieval module 291 and/or the reports module 292. The parameters may pertain to system administration parameters that apply to general implementations of the solution 290 (e.g., pre-configured data collection) or to user parameters that apply to specific implementations of the solution 290 (e.g., real-time data collection). The data retrieval module 291, in step 330, uses the parameters to gather specific data defined at least in part by the parameters. The data retrieval module 291 may gather data from one or more search engine files, one or more content source files (e.g., video, image, document and various other non-html files), one or more web files associated with the client(s) 130, and/or one or more web analytics system files. Upon gathering data, the data retrieval module 291, in step 340, stores the data in the database 143. The reports module 292, in step 350, accesses the database 143 to retrieve data associated with the parameters, and then, in step 360, produces one or more types of reports. In step 370, the generated reports are exported to the UI module 293, which displays one or more visual representations of the reports to the user.

Data Retrieval Module

The data retrieval module 291 gathers data for use by the reports module 292 in generating one or more reports that are visually represented via the UI module 293. The data may be gathered from any number of sources, including by way of example, one or more search engines (e.g., the search engines 120), one or more content sources (e.g., one or more videos, images and/or documents such as .pdf, .doc, and .xls files, among others)), one or more sites associated with the client(s) 130, and/or one or more web analytics systems.

For example, the data collected by the data retrieval module 291 may include traffic levels from one or more search engines to one or more pages of one or more sites. Collected data may also include a number of pages for one or more sites that are indexed by one or more search engines or social networks, and whether particular keywords exist in the indexing. The data retrieval module 291 may also collect data associated with an indexed page's category, title, description, and URL with respect to the one or more search engines or social networks. Alternatively or additionally, data pertaining to whether one or more keywords are found in a page's title, meta content and/or headers may be collected. Collected data may also include a total number of pages for one or more sites, and whether a sitemap link exists on the home page(s) of one or more sites.

The data retrieval module 291 may alternatively or additionally collect page-level data, including URL character length, page size, keyword density, existence of flash navigation, existence of JavaScript navigation, existence of page errors, and existence of header tags, among others. One of skill in the art will recognize that the data retrieval module 291 may collect data specific to any type of page, including preferred landing pages.

Additional data collected by the data retrieval module 291 may include rankings or a number of ranked positions of one or more pages or sites with respect to one or more organic search engine results that are based on one or more search terms (e.g., one or more keywords) during one or more time periods.

One of skill in the art will appreciate alternative forms of data within both the scope and spirit of the invention that the data retrieval module 291 may gather, including additional web analytics data and/or data accessible via application programming interfaces (APIs) associated with search engines.

Report Generator Module

Attention is drawn to the reports module 292 of FIG. 2, which functions to receive parameters from the UI module 293, retrieve data from the database 143, generate one or more reports based on the parameters and the retrieved data, and then send the generated reports to the UI module 293. The generation of reports may be automated (e.g., the generation of reports occurs at specified time intervals). When generating the reports, the reports module 292 may use one or more linear and/or non-linear combinations involving one or more scored representations to achieve quantifiable metrics pertinent to the client 130.

A combination may include, by way of example, a mathematical operation such as addition, subtraction, multiplication, division, weighting, and averaging, among others.

A scored representation may include, but not by way of limitation, an alphanumeric representation of data collected by the data retrieval module 291 (e.g., 0, 1, 2, . . . , n and a, b, c, . . . z) and/or an alphanumeric representation of a resultant value derived from one or more linear/non-linear combinations.

A quantifiable metric may be, for example, indicative of a parameter or feature of a site that may be modified to optimize the site with respect to an organic ranking of the site at a search engine. By way of example, in one embodiment a feature may reflect an inefficient or an unrealized use of a keyword with respect of the site's paid or organic ranking in search engine results. In another embodiment, a feature may reflect an undesired visitor traffic pattern on the site following a selection of the site by the visitor from a listing of search results at a search engine. In yet another embodiment, a feature may reflect the existence of any number of aspects relating to a site, including accessibility-related aspects, site construction-related aspects, and/or search engine-related aspects. For example, accessibility-related aspects may reflect whether a sitemap exists on the site's homepage and/or whether the site exists in a Yahoo! and/or DMOZ (i.e., the Open Directory Project) directory. Site construction-related aspects may reflect exceeded page sizes, exceeded URL character lengths, lack of flash navigation, lack of header tags, lack of a keyword in header tags, lack of a keyword is a page title, and/or lack of a keyword in page meta content. Search engine-related aspects may reflect a ranking of a site or pages of the site in organic and/or paid search results of one or more search engines. One of skill in the art will appreciate various other features that may be indicated using configurable metrics, including any of the 'Collected Data' described below with respect to Table 1.

As stated above, the reports module 292 may employ computations that are configurable in terms of scored representations and combinations. For example, a first scored representation may be weighted, a second scored representation may be weighted, the resultant weighted scored representations may be summed to achieve a summed result, and the summed result may be divided by a sum of the weights. In such a case, the reports module 292 employs four combinations: 1) the weighting of the first scored representation, 2) the weighting of the second scored representation, 3) the summing of the two weighted scored representations, and 4) the dividing of the summed weighted scored representations by the sum of the weights. One of skill in the art will appreciate that any number of combinations of any number of scored representations may be used to quantify metrics pertinent to the client 130. By way of example, Table 1 displays a listing of data, scored representations of such data, and weights applied to the scored representations.

TABLE 1

| Collected Data | | Scored Representations | | Weights |
|---|---|---|---|---|
| whether a sitemap link exists on site's home page | $V_1$ | Existence: 1; No existence: 0 | $w_1$ | 5 |
| whether a site exists in a directory (e.g., Yahoo!) | $V_2$ | Existence: 1; No existence: 0 | $w_2$ | 4 |
| whether a site exists in a directory (e.g., DMOZ) | $V_3$ | Existence: 1; No existence: 0 | $w_3$ | 4 |
| whether a site exists in a directory (e.g., Yahoo!), and a keyword does or does not exists in the description of the site in the directory | $V_4$ | Existence of both: 1; Existence of site only: 0.75; No existence of site: 0 | $w_4$ | 4 if both exist, 2 if only the site exists |
| whether a site exists in a directory (e.g., DMOZ), and a keyword does or does not exists in the description of the site in the directory | $V_5$ | Existence of both: 1; Existence of site only: 0.75; No existence of site: 0 | $w_5$ | 4 if both exist, 2 if only the site exists |
| whether HTML parseable or page access errors exist for a particular page | $V_6$ | No existence of errors: 1 HTML error exists without access error: 0.5 Existence of access error: 0 | $w_6$ | 5 if no errors, 3 if HTML error exists without access error |
| whether the character length of a particular page's URL exceeds a reconfigurable length (e.g., 255 characters) | $V_7$ | Does not exceed length: 1; Exceeds length: 0 | $w_7$ | |
| whether the size of a particular page falls within a reconfigurable size range (e.g., <100K, 100-200K, >200K) | $V_8$ | page size <100K: 1; page size of 100-200K: 0.5; page size >200K: 0 | $w_8$ | 1 if <100K, 3 if 100-200K |
| whether flash navigation exists on a page and whether the characters on the page exceed a reconfigurable number (e.g., 150 characters) | $V_9$ | No flash: 1; Flash & length exceeded: 1; Flash & length not exceeded: 0; | $w_9$ | 2 |
| whether a JavaScript (JS) link to a page external to a site or to a page of the site that is listed in the sitemap exists for a particular page, or whether a JavaScript link to a page of the site that is not listed in the sitemap exists, or whether a reconfigurable percentage of the site has JavaScript links | $V_{10}$ | Existence of JS link to external page or sitemapped page: 1; No existence of above & existence of JS link to non-sitemapped page: 0; JS link percentage exceed: 0 | $w_{10}$ | 2 |
| whether H1 header tags exist on a particular page | $V_{11}$ | Existence: 1; No existence: 0 | $w_{11}$ | 5 |
| whether H2 header tags exist on a particular page | $V_{12}$ | Existence: 1; No existence: 0 | $w_{12}$ | 4 |
| whether H3 header tags exist on a particular page | $V_{13}$ | Existence: 1; No existence: 0 | $w_{13}$ | 2 |
| whether a particular keyword exists in the title of a particular page | $V_{14}$ | Existence: 1; No existence: 0 | $w_{14}$ | 5 |
| whether a particular keyword exists in the meta content of a particular page | $V_{15}$ | Existence: 1; No existence: 0 | $w_{15}$ | 4 |
| whether a particular keyword exists in the H1-H3 header of a particular page | $V_{16}$ | Existence: 1; No existence: 0 | $w_{16}$ | 5 if H1, 4 if H2 and no H1, 2 if only H3 |
| ranking of the top-ranked page for a particular keyword and for a particular search engine (e.g., Yahoo!, MSN, Google) | $V_{17}$ | [$1^{st}$]: 1.0; [$2^{nd}$]: 0.917; [$3^{rd}$]: 0.833; [$4^{th}$]: 0.75; [$5^{th}$]: 0.708; [$6^{th}$]: 0.667; [$7^{th}$]: 0.625; [$8^{th}$]: 0.583; [$9^{th}$]: 0.542; [$10^{th}$]: 0.5; [$11^{th}$]: 0.476; [$12^{th}$]: 0.452; [$13^{th}$]: 0.429; [$14^{th}$]: 0.405; [$15^{th}$]: 0.381; [$16^{th}$]: 0.357; [$17^{th}$]: 0.333; [$18^{th}$]: 0.310; [$19^{th}$]: 0.286; [$20^{th}$]: 0.262; [$21^{st}$]: 0.238; [$22^{nd}$]: 0.214; [$23^{rd}$]: 0.191; [$24^{th}$]: 0.167; [$25^{th}$]: 0.143; [$26^{th}$]: 0.119; [$27^{th}$]: 0.095; [$28^{th}$]: 0.071; [$29^{th}$]: 0.048; [$30^{th}$]: 0.024; [$31^{st}$ and above]: 0.0 | $w_{17}$ | 1 |
| Check for existence of title tags, use of keywords in title tag, and uniqueness of title tag across site. | $V_{18}$ | Exists, is unique, and has keywords: 1; Exists and has keywords: .66; Exists: .33; Doesn't exist: 0 | $w_{18}$ | 5 |
| Check for existence of meta tags, use of keywords in meta tags | $V_{19}$ | Exists and has keywords: 1; Exists: .5; Doesn't Exist: 0 | $w_{19}$ | 4 |
| Check for existence of body | $V_{20}$ | Exists and has content: 1; | $W_{20}$ | 3 |

TABLE 1-continued

| Collected Data | | Scored Representations | | Weights |
|---|---|---|---|---|
| tag and content in the body tag. | | Doesn't exist and doesn't have content: 0 | | |
| Keyword density (KWD) score to check how many keywords are used in text vs. all words in text (within configurable desired range). | $V_{21}$ | 1 if KWD >=7%, .5 if KWD <7% and >=2% and 0 if KWD <2% | $W_{21}$ | 5 |
| Keyword emphasis (KWE) score to check how many times a keywords is emphasized in the website with bold type, italics, underscore, etc., versus the total number of times the keyword is used in the website, or versus other emphacized and/or non-emphacized words in the website (within configurable desired range). | $V_{22}$ | 1 if KWE >25%, .5 if KWE <=25% and >10% and 0 if KWE <=10% | $W_{22}$ | 3 |
| whether there are HTTP errors when accessing the page/site | $V_{23}$ | No errors: 1; Errors: 0 | $W_{23}$ | 5 |
| whether there are session ids in the URL of a page | $V_{24}$ | No session IDs: 1; Session IDs exist: 0 | $W_{24}$ | 3 |
| whether there are dynamic (HTTP) parameters in the URL of a site. | $V_{25}$ | No Dynamic Parameters: 1; Dynamic Parameters Exist: 0 | $W_{25}$ | 2 |
| Inbound link analysis for EDU domains | $V_{26}$ | 1 if number of inbound links exists above a configurable threshold equaling a number of acceptable inbound links from the EDU domain, 0 if not above threshold | $W_{26}$ | 5 |
| Inbound Link analysis for GOV domains | $V_{27}$ | 1 if number of inbound links exists above a configurable threshold equaling a number of acceptable inbound links from the GOV domain, 0 if not above threshold | $W_{27}$ | 5 |
| Inbound link analysis for all inbound links | $V_{28}$ | 11 if number of inbound links exists above a configurable threshold equaling a number of acceptable inbound links from all sources, 0 if not above threshold | $W_{28}$ | 4 |
| Inbound link analysis from social networks (del.icio.us, Digg, etc.) | $V_{29}$ | 1 if number of inbound links exists above a configurable threshold equaling a number of acceptable inbound links from the social network(s), 0 if not above threshold | $W_{29}$ | 4 |
| Inbound link analysis from vertical search engines (Technorati, etc.) | $V_{30}$ | 1 if number of inbound links exists above a configurable threshold equaling a number of acceptable inbound links from the vertical serach engine(s), 0 if not above threshold | $W_{30}$ | 4 |
| Inbound link analysis from wikis (Wikipedia, etc.) | $V_{31}$ | 1 if number of inbound links exists above a configurable threshold equaling a number of acceptable inbound links from the wiki(s), 0 if not above threshold | $W_{31}$ | 4 |
| Inbound link analysis from blogs | $V_{32}$ | 1 if number of inbound links exists above a configurable threshold equaling a number of acceptable inbound links from the blog(s), 0 if not above threshold | $W_{32}$ | 4 |
| Internal link analysis - links between pages on site and keyword optimization for internal links. | $V_{33}$ | 1 if exists and links with keyword as link text, .5 if exists, and 0 if no internal links to a given page. | $W_{33}$ | 3 |
| whether there are keywords in the URL of a page | $V_{34}$ | No keywords: 0; keywords exist: 1 | $W_{34}$ | 4 |
| the number of directories a page is from the domain (e.g., http://www.domain.com/first_directory/second_directory) | $V_{35}$ | domain itself: 1; one directory away: .75; two directories away: .5; three directories away: .25; four or greater directories away: 0.0 | $W_{35}$ | 2 |

As shown in Table 1, scored representation $V_1$ represents whether a sitemap link exists on the home page of a site. If a sitemap exists, a scored representation of "1" is used to represent $V_1$. Otherwise, if a sitemap does not exist, a scored representation of "0" is used to represent $V_1$. In either case, a weight $w_1$ (e.g., "5") may be applied to the scored representation.

The scored representations may be represented by any type of strength or grading indicator (e.g., alphanumeric representations, color-coding). Each scored representation, as well as combinations of scored representations may be weighted with adjustable weights (e.g., rational numbers) configurable via the UI module 293.

By way of example, Table 2 presents a listing of combinations.

TABLE 2

Combinations

| | |
|---|---|
| $C_1$ | $[(V_1) * (w_1) + (V_4) * (w_4) + (V_5) * (w_5)]/[(w_1) + (w_4) + (w_5)]$ |
| $C_2$ | $[(V_{14}) * (w_{14}) + (V_{15}) * (w_{15}) + (V_{16}) * (w_{16})]/[(w_{14}) + (w_{15}) + (w_{16})]$ |
| $C_3$ | Average of $C_2$ for selected keywords |
| $C_4$ | $[(V_6) * (w_6) + (V_7) * (w_7) + (V_8) * (w_8) + (V_9) * (w_9) + (V_{10}) * (w_{10}) + (V_{11}) * (w_{11}) + (V_{12}) * (w_{12}) + (V_{13}) * (w_{13}) + (C_3) * (w_{c3})]/[(w_6) + (w_7) + (w_8) + (w_9) + (w_{10}) + (w_{11}) + (w_{12}) + (w_{13}) + (w_{c3})]$ |
| $C_5$ | Average of $C_3$ for selected pages |
| $C_6$ | $[(C_1) * (w_{c1}) + (C_5) * (w_{c5})]/[(w_{c1}) + (w_{c5})]$ |
| $C_7$ | Average of $V_{17}$ for selected search engines |
| $C_8$ | Average of $C_7$ for selected keywords |

As shown in Table 2, combination $C_1$ is formed by dividing the sum of weighted scored representations $w_1V_1$, $w_4V_4$ and $w_5V_5$ by the sum of the scored representations weights $w_1$, $w_4$ and $w_5$. One of skill in the art will appreciated that combinations may be used as scored representations in other combinations. For example, combinations $C_1$ and $C_5$ are used as scored representations in combination $C_6$, and combination $C_3$ is used as a scored representation in combination $C_4$. One of skill in the art will also appreciate that combinations used as scored representations in other combinations may be weighted. For example, weight $w_{c3}$ may be any negative or positive rational number (e.g., 5), weight $w_{c1}$ may be any negative or positive rational number (e.g., 3), and weight $w_{c5}$ may be any negative or positive rational number (e.g., 5).

One of skill in the art will recognize alternative combinations than those shown in Table 2. Additionally, one of skill in the art will appreciate that combinations may be configurable, via the UI module 293, in terms of scored representations, weights and mathematical operations.

User Interface ("UI") Module

The UI module 293 receives filtering and customization parameters from a user, sends at least a portion of those parameters to the data retrieval module 291 and/or the reports module 292, receives one or more reports from the reports module 292, and displays one or more visual representations of the report(s) received from the reports module 292. The visual representations may be formed of alphanumerical, color-coded, graphical, image-based, or any other type of representation.

At least a portion of the filtering parameters received by the UI module 293 define the scope of data collection by the data retrieval module 291 and/or data retrieval by the reports generator 292. For example, the parameters may define the scope of data collection and/or data retrieval in terms of one or more instances or periods of time (e.g., date ranges, triggered events). Alternatively or additionally, the parameters may define the scope of data collection and/or data retrieval in terms of the types of data previously described with respect to the data retrieval module 291.

At least a portion of the customization parameters define the report(s) generated by the reports module 292. The customization parameters allow a user to configure the visual representation of the generated reports. Customization parameters may include parameters similar to those described above with respect to the filtering parameters. Additionally, the customization parameters may include drill-down, online analytical processing (OLAP), research and sorting parameters (e.g., ascending or descending organization), as well as display parameters (e.g., numeric, color-coded, or video/image representation display parameters).

Figure 4:
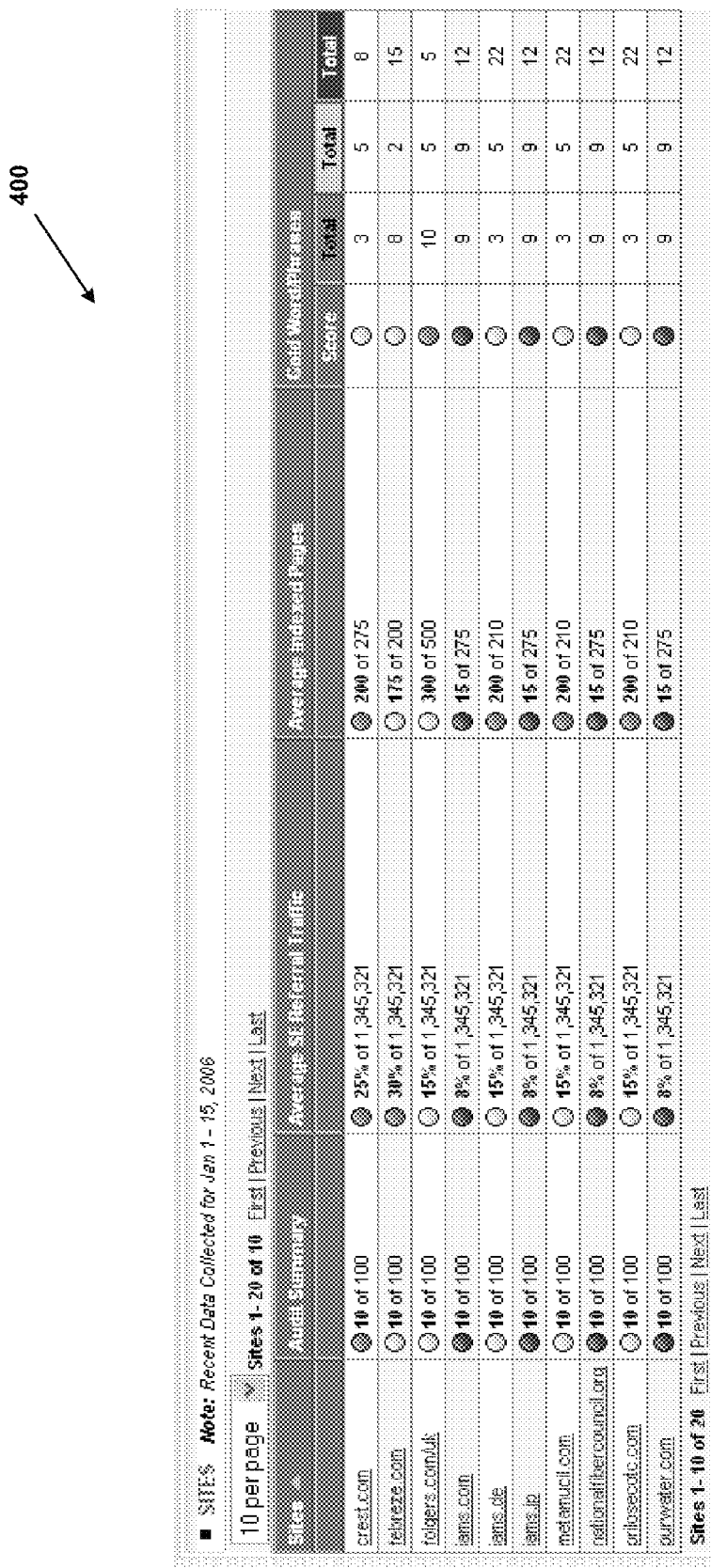
FIG. 4 illustrates a first user interface that may be presented to a user when representing client-pertinent metrics developed during linear and/or non-linear combinations in accordance with certain aspects of the invention.
Figure 5:
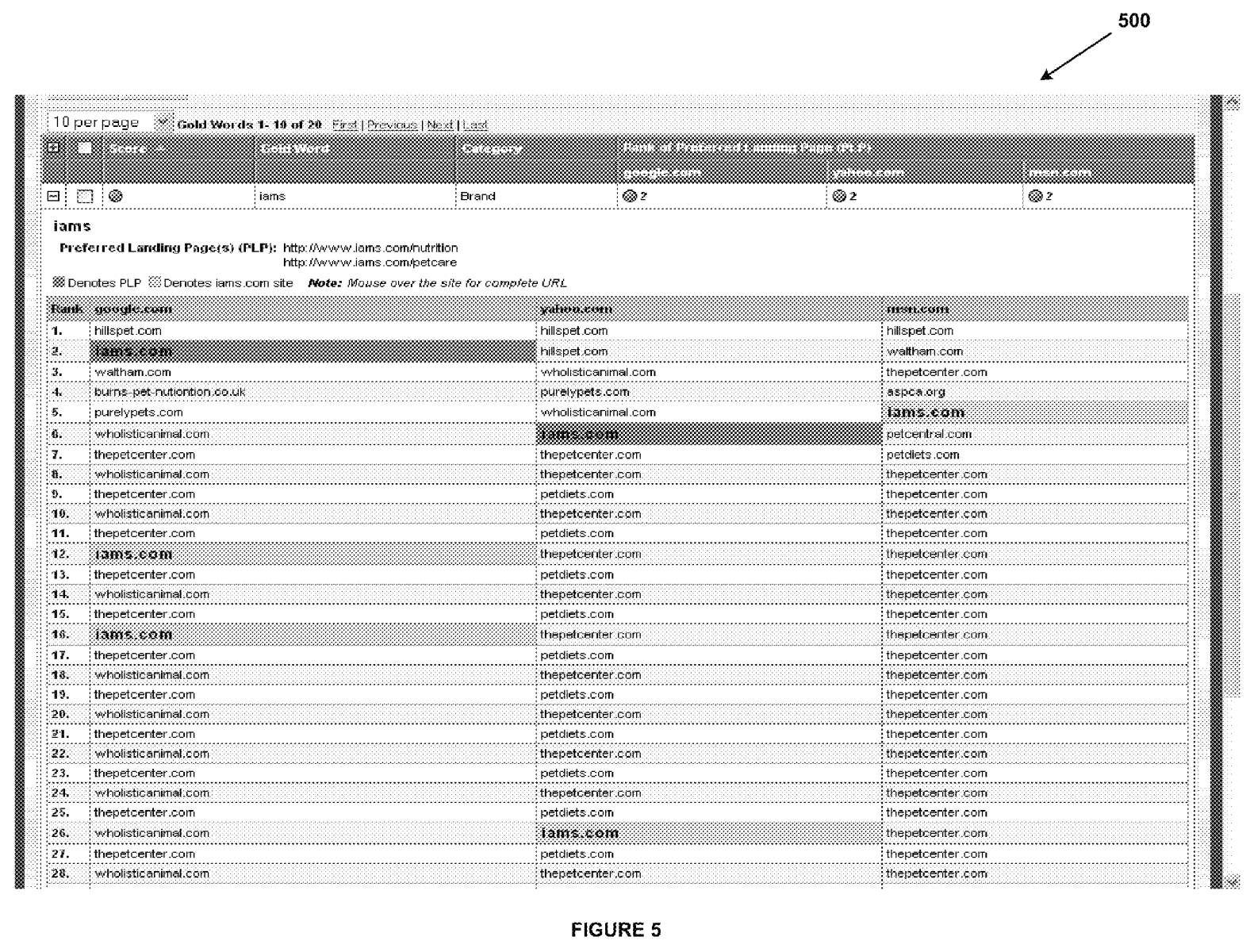
Figure 6:
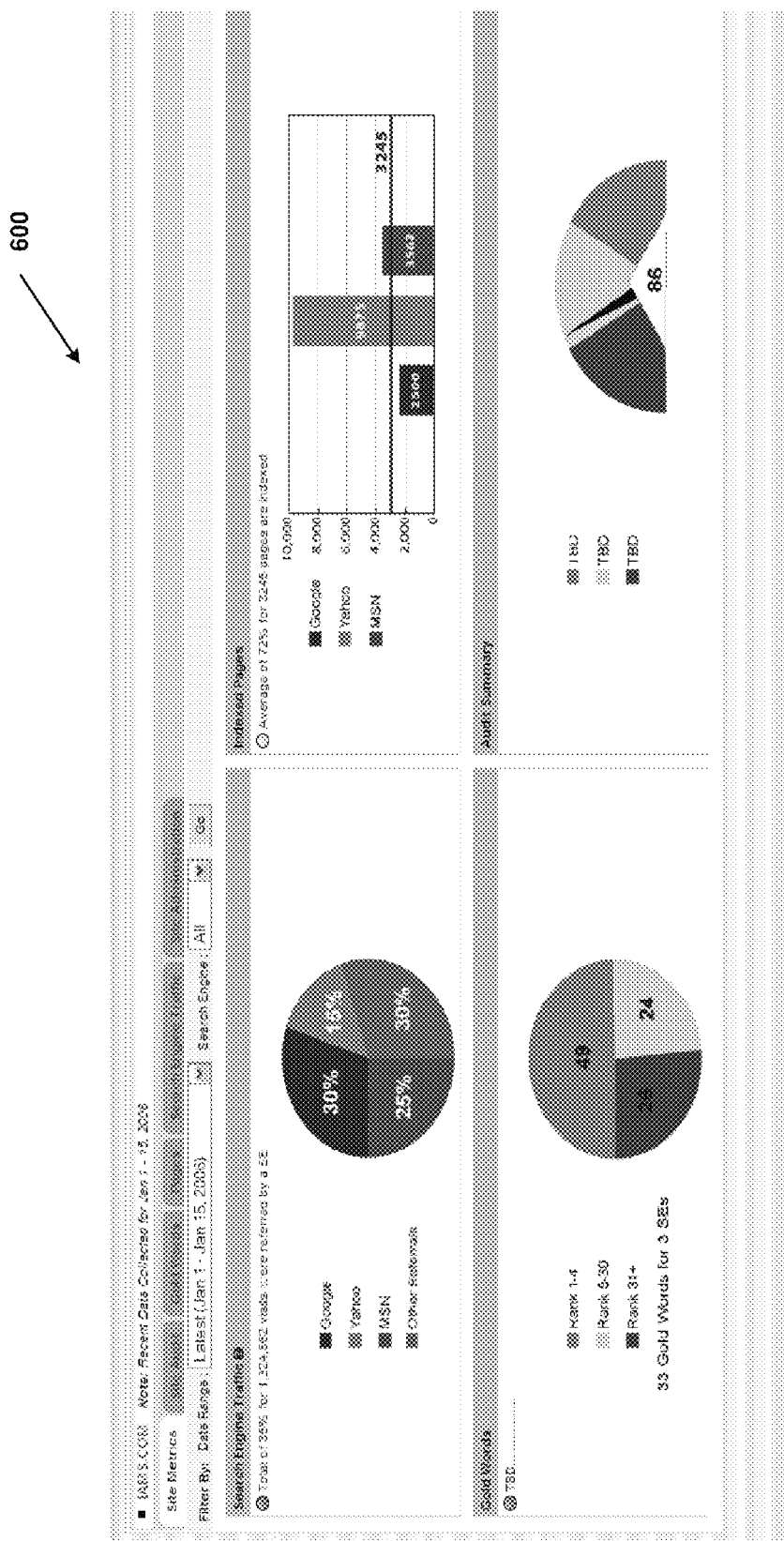
FIG. 6 illustrates a third user interface that may be presented to a user when representing client-pertinent metrics developed during linear and/or non-linear combinations in accordance with certain aspects of the invention.

Attention is now drawn to FIGS. 4-6, which represent different user interfaces that the UI module 293 may present to a user when representing client-pertinent metrics developed during the linear and/or non-linear combinations described above with respect to the reports module 292. FIG. 4 includes a table 400 that displays client-pertinent metrics with respect to multiple sites. FIG. 5 displays a table 500 that lists multiple sites and their rank with respect to multiple search engines. FIG. 6 comprises multiple charts 600 that illustrate client-pertinent metrics with respect to a single site (e.g., a site selected from the multiple sites listed in FIG. 4 or FIG. 5).

One of skill in the art will appreciate alternative embodiments wherein all or a portion of the reports generated by the reports module 292 are accessible by one or more computer systems/visual displays external to the analysis system 140 (e.g., via triggered or automatic emailing or other methods within both the scope and spirit of the invention). One of skill in the art will also appreciate alternative embodiments in which the reports module 292 develops one or more reports when triggering events occur (i.e., under preconfigured circumstances).

Client Architecture

Figure 7:
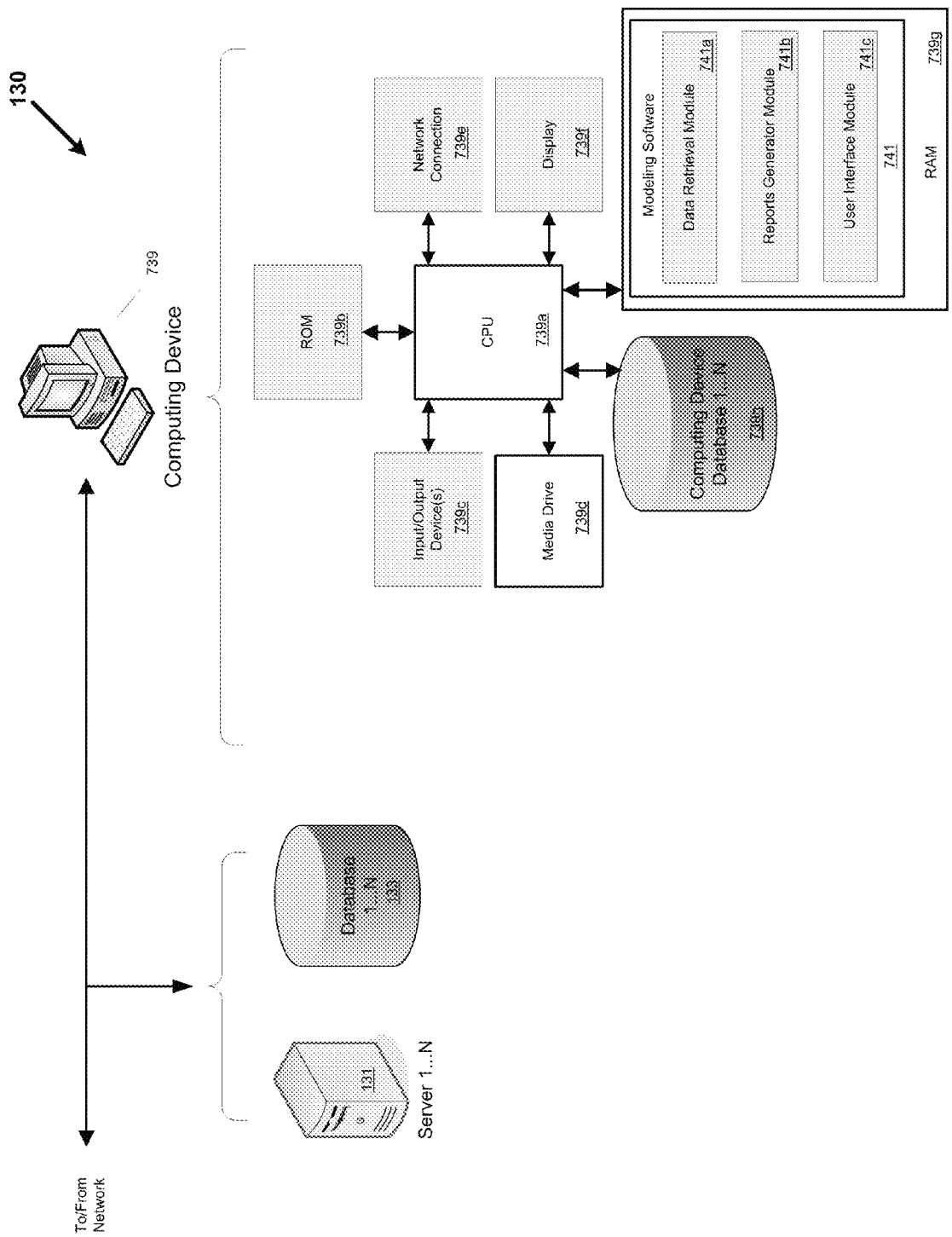
FIG. 7 shows a block diagram depicting an alternative system for analyzing search engine optimization effectiveness of a website.

Attention is now drawn to FIG. 7, which depicts an exemplary implementation of the client 130. As is shown, the client 130 includes a server 131 connected to a database 133, both of which may communicate either directly or indirectly with the communication network 110. FIG. 7 also includes a computing device/system 739 configured in accordance with one implementation of the invention. The computing device 739 may include, but not by way of limitation, a personal computer (PC), a personal digital assistant (PDA), a cell phone, a television (TV), etc., or any other device configured to send/receive data to/from the communication network 110, such as consumer electronic devices and hand-held devices.

The implementation depicted in FIG. 7 includes a processor 739a coupled to ROM 739b, input/output devices 739c (e.g., a keyboard, mouse, etc.), a media drive 739d (e.g., a disk drive, USB port, etc.), a network connection 739e, a display 739f, memory 739g (e.g., random access memory (RAM)), and a file storage device 739h.

The storage device 739h is described herein in several implementations as a hard disk drive for convenience, but this is certainly not required, and one of ordinary skill in the art will recognize that other storage media may be utilized without departing from the scope of the invention. In addition, one of ordinary skill in the art will recognize that the storage device 739h, which is depicted for convenience as a single storage device, may be realized by multiple (e.g., distributed) storage devices.

As shown, a software solution 741 includes a data retrieval module 741a, a reports generator module 741b, a user interface module 741c, all of which are implemented in software and are executed from the memory 739g by the processor 739a. The software 741 can be configured to operate on personal computers (e.g., handheld, notebook or desktop), servers or any device capable of processing instructions embodied in executable code. Moreover, one of ordinary skill in the art will recognize that alternative embodiments implementing one or more components in hardware are within the scope of the invention. Each module 741a-c function similarly to modules 291, 292 and 293, respectively, of FIG. 2.

The exemplary systems and methods of the invention have been described above with respect to the analysis system 140 and/or the client 130. One of skill in the art will appreciate alternative embodiments wherein the functions of the analysis system 140 are performed on other devices in the networked system 100.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A computer program product comprising a computer usable storage medium having a computer readable program code embodied therein, said computer readable program code adapted to be executed to implement a method for optimizing a website in accordance with search engine results, the method comprising:
    acquiring data associated with the website;
    generating a plurality of weights associated with inbound links to a web page associated with the website, the plurality of weights including a first weight associated with a first source type of the inbound links and a second weight associated with a second source type of the inbound links, wherein the first weight is a different value than the second weight and the first source type is a different source type than the second source type, and the first and second source types are chosen from a group consisting of a .edu domain source type, a .gov domain source type, a social network source type, a vertical search engine source type, a blog source type and a wiki source type; and
    generating a first scored representation, wherein said generating a first scored representation is based upon the first and second weights and one or more link metrics representing whether a first keyword is included in one or more of link text of an inbound link to the webpage from the .edu domain source type, link text, of an inbound link to the webpage from the .gov domain source type, link text of an inbound link to the webpage from the social network source type, link text of an inbound link to the webpage from the vertical search engine source type, link text of an inbound link to the webpage from the blog source type, or link text of an inbound link to the webpage from the wiki source type,
    wherein relative values of the first and second weights are configurable to quantify relative pertinence of the first and second source types.

2. The computer program product of claim 1, wherein the first scored representation is generated based upon at least two of the link metrics.

3. The computer program product of claim 1, further comprising:
    generating a second scored representation, wherein said generating a second scored representation is based upon one or more technical metrics representing whether a character length of a URL of the website exceeds a maximum URL character length, whether a webpage size of the website exceeds a maximum webpage size, whether flash navigation is used on the website, whether javascript navigation is used on the website, whether session identifiers are used in the URL, or whether dynamic parameters are used in the URL; and
    generating a third scored representation, wherein said generating a third scored representation is based upon one or more content metrics representing whether a first keyword of a plurality of keywords is included in a title tag of the website, meta content of the website, a header tag of the website, a body tag of the website, a URL of the website, or in the website in accordance with a density threshold.

4. The computer program product of claim 3, wherein the first scored representation is generated based upon at least three of the link metrics, the second scored representation is generated based upon at least three of the content metrics, and the third scored representation is generated based upon at least three of the content metrics.

5. The computer program product of claim 4, the method further comprising:
    normalizing the first scored representation, the second scored representation and the third scored representation to achieve a result.

6. The computer program product of claim 4, the method further comprising:
    combining the first scored representation, the second scored representation and the third scored representation to achieve a result.

7. The computer program product of claim 4, the method further comprising:
    averaging or normalizing scored representations for each of the at least three link metrics to generate the first scored representation;
    averaging or normalizing scored representations for each of the at least three technical metrics to generate the second scored representation;
    averaging or normalizing scored representations for each of the at least three content metrics to generate the third scored representation; and
    combining the first scored representation, the second scored representation and the third scored representation to generate a final scored representation.

8. The computer program product of claim 7, the method further comprising:
    recommending, based on the final scored representation, at least one modification to one or more parameters of the website in order to improve an organic ranking of the website with respect to one or more search engines, wherein the recommending at least one modification to one or more parameters of the website includes recommending one or more of an increase of a number of inbound links of the website, a decrease of a length of a URL of the website, a decrease of a webpage size based on a determination that the size of the website exceeds a maximum size, a removal of dynamic parameters from the URL, a removal of flash navigation from the website, a use of a keyword in a title tag of the website, a use of the keyword in meta content of the website, a use of the keyword in a header tag of the website, and a use of a keyword in the website that exceeds a density threshold.

9. The computer program product of claim 4, the method further comprising:

averaging scored representations for each of the at least three link metrics to generate the first scored representation;

averaging scored representations for each of the at least three technical metrics to generate the second scored representation;

averaging scored representations for each of the at least three content metrics to generate the third scored representation; and normalizing the first scored representation, the second scored representation and the third scored representation to generate a final scored representation.

10. The computer program product of claim 1, the method further comprising:

recommending, based on the first scored representation, at least one modification to one or more parameters of the website in order to improve an organic ranking of the website with respect to one or more search engines.

11. The computer program product of claim 10, wherein the recommending at least one modification to one or more parameters of the website includes recommending three or more of an increase of a number of inbound links of the website, a decrease of a length of a URL of the website, a decrease of a webpage size based on a determination that the size of the website exceeds a maximum size, a removal of dynamic parameters from the URL, a removal of flash navigation from the website, a use of a keyword in a title tag of the website, a use of the keyword in meta content of the website, and a use of the keyword in a header tag of the website, and also recommending a use of a keyword in the website based on a density threshold.

12. The computer program product of claim 10, wherein the recommending at least one modification to one or more parameters of the website includes recommending two or more of an increase of a number of inbound links of the website, a use of a keyword in a title tag of the website, a use of the keyword in meta content of the website, and a use of the keyword in a header tag of the website, and also recommending a use of a keyword in the website based on a density threshold.

13. The computer program product of claim 1, wherein the first scored representation is generated based upon at least three of the link metrics.

14. The computer program product of claim 13, the method further comprising:

normalizing scored representations of each of the at least three link metrics to generate the first scored representation.

15. The computer program product of claim 13, the method further comprising:

averaging scored representations of each of the at least three link metrics to generate the first scored representation.

16. The computer program product of claim 1, the method further comprising:

recommending, based on the first scored representation, at least one modification to one or more parameters of the website in order to improve an organic ranking of the website with respect to one or more search engines, wherein the recommending at least one modification to one or more parameters of the website includes recommending one or more of an increase of a number of inbound links of the website, a use of a keyword in a title tag of the website, a use of the keyword in meta content of the website, a use of the keyword in a header tag of the website, and a use of a keyword in the website that exceeds a density threshold.

\* \* \* \* \*